(12) United States Patent
Berkcan et al.

(10) Patent No.: US 8,830,448 B2
(45) Date of Patent: Sep. 9, 2014

(54) REMOTE MONITORING OF TIGHTNESS OF STATOR WINDINGS

(75) Inventors: Ertugrul Berkcan, Clifton Park, NY (US); Brock Matthew Lape, Clifton Park, NY (US); John Frederick Graf, Ballston Lake, NY (US); Glen Peter Koste, Niskayuna, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 444 days.

(21) Appl. No.: 13/334,857

(22) Filed: Dec. 22, 2011

(65) Prior Publication Data

US 2013/0162985 A1 Jun. 27, 2013

(51) Int. Cl.
*G01B 11/16* (2006.01)
*G01L 5/00* (2006.01)
*G01M 11/08* (2006.01)

(52) U.S. Cl.
CPC ........... *G01M 11/086* (2013.01); *G01L 5/0057* (2013.01); *G01B 11/16* (2013.01)
USPC .............................. 356/32; 356/432; 356/614

(58) Field of Classification Search
CPC combination set(s) only.
See application file for complete search history.

(56) References Cited

U.S. PATENT DOCUMENTS

| 4,360,247 | A | 11/1982 | Beasley |
| 5,012,684 | A | 5/1991 | Humphries |
| 5,020,234 | A | 6/1991 | Alkire et al. |
| 5,096,277 | A * | 3/1992 | Kleinerman ................ 385/12 |
| 5,295,388 | A | 3/1994 | Fisher et al. |
| 5,363,463 | A * | 11/1994 | Kleinerman ................ 356/432 |
| 5,365,166 | A | 11/1994 | Dailey et al. |
| 5,524,474 | A | 6/1996 | Lavallee et al. |
| 5,892,615 | A | 4/1999 | Grubb et al. |
| 6,631,335 | B2 | 10/2003 | Lusted et al. |
| 7,068,868 | B1 | 6/2006 | Pi et al. |
| 7,112,909 | B2 | 9/2006 | Swartout et al. |
| 7,418,858 | B2 | 9/2008 | Fisher et al. |
| 7,743,675 | B2 | 6/2010 | Moore |
| 7,852,105 | B2 | 12/2010 | Seeley et al. |
| 8,076,909 | B2 * | 12/2011 | Diatzikis et al. ................ 385/12 |
| 8,098,967 | B1 * | 1/2012 | Bazzone ................ 385/12 |
| 2006/0029344 | A1 | 2/2006 | Farroni et al. |

(Continued)

FOREIGN PATENT DOCUMENTS

| EP | 0794437 A2 | 9/1997 |
| EP | 2194388 A2 | 6/2010 |

(Continued)

OTHER PUBLICATIONS

Search Report from corresponding GB Application No. GB1222309.5 dated Feb. 14, 2013.

*Primary Examiner* — Kara E Geisel
*Assistant Examiner* — Juan D Valentin, II
(74) *Attorney, Agent, or Firm* — Ann M. Agosti

(57) ABSTRACT

A system for monitoring tightness of stator windings in an electric machine is provided. The system includes a light source for providing an optical power. The system also includes an optical separation sensor situated in a stator core and including an optical interface element for absorbing some of the optical power. Further, the system includes a power meter for measuring at least one intensity of the optical power after absorption by the optical interface element and a control subsystem for assessing the tightness of the stator windings.

13 Claims, 4 Drawing Sheets

(56) References Cited

U.S. PATENT DOCUMENTS

| | | |
|---|---|---|
| 2006/0283234 A1 | 12/2006 | Fischer et al. |
| 2008/0036336 A1* | 2/2008 | Salem et al. ............... 310/68 B |
| 2008/0158542 A1* | 7/2008 | Otugen et al. .............. 356/35.5 |
| 2009/0245717 A1* | 10/2009 | Iversen et al. ................ 385/12 |
| 2011/0301874 A1 | 12/2011 | Reed |
| 2012/0026482 A1* | 2/2012 | Dailey ............................ 356/43 |
| 2012/0049697 A1* | 3/2012 | Andarawis et al. ......... 310/68 B |
| 2012/0086443 A1* | 4/2012 | Bazzone ......................... 356/32 |

FOREIGN PATENT DOCUMENTS

| | | |
|---|---|---|
| GB | 2461532 A | 1/2010 |
| GB | 2477405 A | 8/2011 |
| GB | 2490583 A | 11/2012 |
| JP | 7183560 A | 7/1995 |
| WO | 9325866 A1 | 12/1993 |
| WO | 199641124 A1 | 12/1996 |

* cited by examiner

REMOTE MONITORING OF TIGHTNESS OF STATOR WINDINGS

BACKGROUND

The invention relates generally to electrical machines and, in particular, to a system and method of monitoring health of electrical machines.

Electrical machines such as power generators and motors typically include a rotating member (or rotor) and a stationary member (or stator). It is useful to monitor stator bar windings of the stator to ensure the windings are motionless during operation of the electrical machine. In some embodiments, an electrical machine includes a wedge system to induce a radial retaining force to a stator for reducing movement of the stator bar windings within slots of the stator. In a more specific embodiment, ripple springs are embedded in the stator winding assembly in a state of compression to keep the windings from moving. In such embodiments, if the wedge system becomes loose, the amount of retaining force is reduced such that the stator bar windings may move during operation. Over time, relative motion of the stator bar windings may cause damage to the insulation surrounding the stator bar wedges and a potential for a stator bar winding failure can occur. To prevent such a failure, the health of the electrical machine is periodically monitored to determine if any stator bar winding movement within the stator slots exceeds predetermined tolerances.

Currently, several methods and systems are used for monitoring stator wedge tightness. One method is to apply steady or impulsive physical force to the stator wedge winding assembly and analyze the resulting deflection. Another method is to apply an excitation signal and analyze the vibratory response. Another method is to measure the profile of the compressed ripple spring in situ and infer the state of compression. Still another method is to install various sensors along the ripple spring that produce signals that may be correlated to the spring's state of compression. Each of these methods for determining the tightness of the wedge requires offline measurements (during which time the generator is not operational) and does not predict the onset of loose wedges. Further, these methods require either time-consuming effort to adjudge the tightness of an individual stator wedge assembly or calibration of a sensor that is proximate to a ripple spring but not an integral part thereof. As the operating environment may reach a continuous temperature in the range −20° C. to 150° C., there is also a need to provide a sensor that will remain stable over the operating temperature regime. Moreover, the accuracies of the sensors often used for monitoring have a tendency to decrease over time.

Therefore, to assess the condition of an electrical machine, there is a need for an efficient monitoring system that more simply and accurately monitors the health of the electrical machine.

BRIEF DESCRIPTION

In accordance with an embodiment of the invention, a system for monitoring tightness of stator windings in an electric machine is provided. The system includes a light source for providing an optical power at multiple wavelengths. The system also includes an optical separation sensor situated in a stator core, wherein the optical separation sensor comprises an optical interface element for differently absorbing the optical power at first and second wavelengths. Further, the system includes a power meter for measuring at least one intensity of the optical power after absorption by the optical interface element and a control subsystem for using the measured intensity of light to assess the tightness of the stator windings.

In accordance with an embodiment of the invention, a ripple spring device is provided. The ripple spring device includes a ripple spring and an optical separation sensor in contact with ripple spring. The optical separation sensor comprises an optical interface element for absorbing optical power from a light source.

In accordance with an embodiment of the invention, a method for monitoring tightness of stator windings in an electrical machine comprises: directing an optical power from a light source to an optical separation sensor located between a plurality of wedge system components; absorbing the optical power by an optical interface element of the optical separation sensor; measuring at least one intensity of the optical power after absorption by the optical interface element; and determining the tightness of the stator windings based on the at least one measured intensity of the optical power and calibration data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
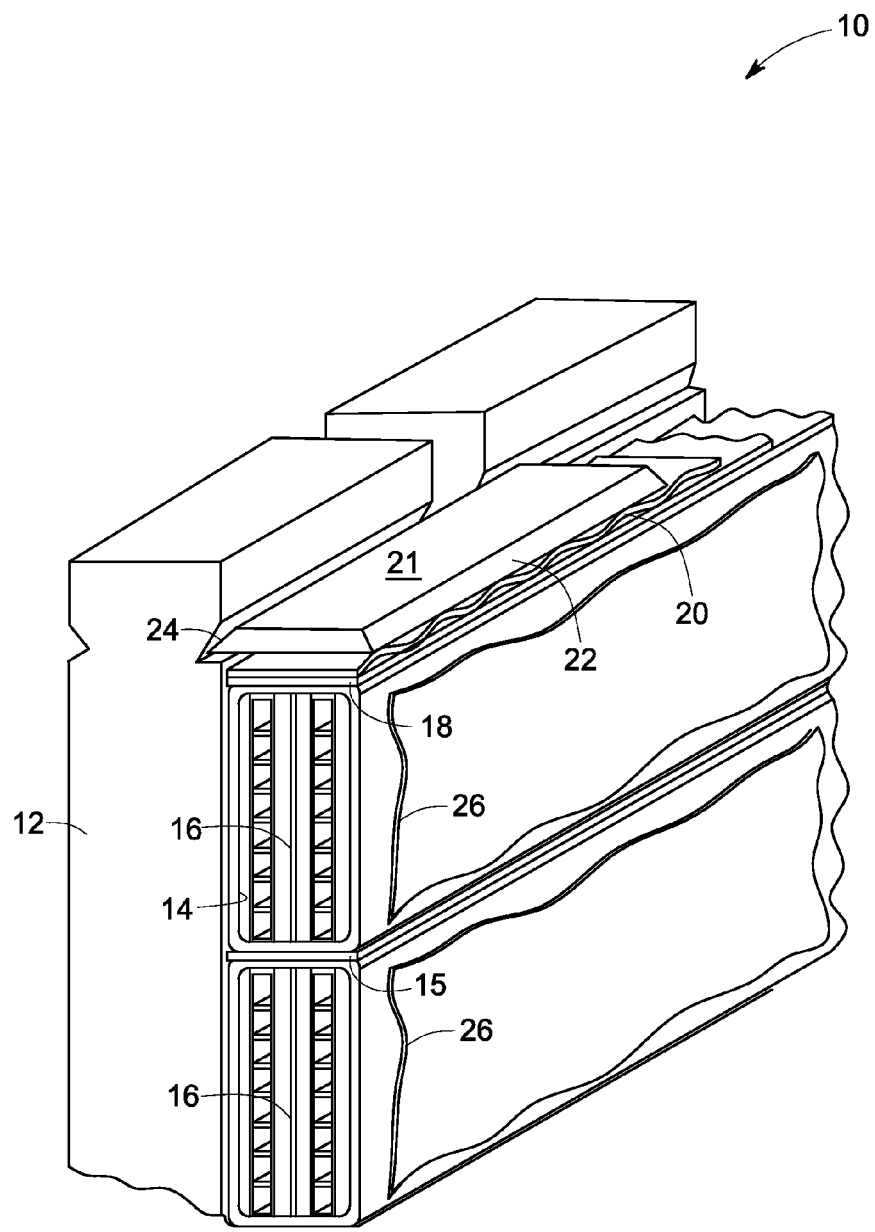
FIG. 1 is a fragmentary isometric view of a portion of the stator of an electric machine illustrating a stator wedge arrangement in accordance with an embodiment of the invention.
Figure 2:
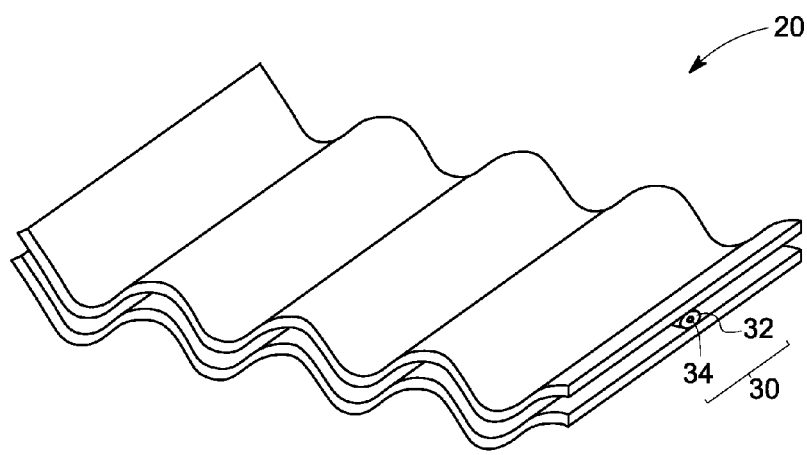
FIG. 2 illustrates an optical separation sensor situated between ripple springs in accordance with an embodiment of the present invention.

FIG. 1 illustrates a fragmentary isometric view of a portion of a stator core 10 of an electrical machine having a stator wedge mechanism in accordance with an embodiment of the invention. The stator core 10 includes multiple stator teeth 12; which define stator slots 14 configured to accommodate stator windings 16 (also referred to as the stator coils). The stator windings 16 may be retained in the stator slots 14 by multiple substrate elements. In the example of FIG. 2, the substrate elements are shown as flat plates 15, shims 18, ripple springs 20 and 26, and stator wedges 21 having beveled edges 22 for engaging correspondingly shaped grooves 24 in the sidewalls of the stator teeth 12. Other non-limiting and non-shown examples of substrate elements include force-to-displacement transducers, axial springs, radial springs, and Belleville washers. The flat plate 15 may comprise a metallic flat plate (conductive) or a non-metallic flat plate (non-conductive).

Outer ripple springs 20 are compressed between the stator wedges 21 and shims 18 to generate a force that firmly holds the stator windings 16 in place. In one embodiment, each of the outer ripple springs 20 is fabricated from a non-conductive material such as, but not limited to, a plastic laminate. Side ripple springs 26 may additionally be used to maintain tight fitting of the stator windings 16 within the stator core 10. Over time, the outer ripple springs 16 or side ripple springs 26 may lose their resiliency and cause the stator wedges 21 to become loose. When the stator wedges 21 loosen, the stator windings 16 may begin to vibrate. Stator winding vibrations may cause damage to the stator core 10 and eventual failure of the electrical machine.

In order to monitor the tightness of the stator wedge mechanism, in one embodiment of the present invention, the ripple springs 20 include one or more embedded sensors for sensing the compression or decompression of the ripple springs 20. In a further embodiment, the one or more sensors are situated between the multiple ripple springs 20 for sensing the compression or decompression of the ripple springs 20. In one embodiment, at least one of the sensors comprises an optical separation sensor situated between two ripple springs 20 as shown in FIG. 2. In other embodiments, the sensor or sensors may be situated between any wedge system components such as ripple springs, wedges, plates, shims, and combinations thereof, for example.

FIG. 2 illustrates an optical separation sensor 30 situated between two ripple springs 20 in accordance with an embodiment of the present invention. The optical separation sensor 30 is located such that a top portion and a bottom portion of the optical separation sensor 30 are in contact with the top and bottom ripple springs 20 respectively. The optical separation sensor 30 may be attached to the ripple springs 20 with adhesives or simply held in place through contact. In another embodiment, a single ripple spring 20 may be used with the optical separation sensor being in direct or indirect contact with that single ripple spring. In this embodiment, the optical separation sensor may be at least partially embedded in the ripple spring or may held in place through adhesion or through compression with another component of the stator, for example.

The optical separation sensor 30 comprises an optical fiber with a cladding 32 enclosing a core 34 for transporting multiple wavelengths of light of which a first wavelength, $\lambda_1$ and a second wavelength, $\lambda_2$ may be the prominent wavelengths in one example. The optical power is propagated forward in the core 34 due to internal reflections of the optical power within the core 34. Surrounding the core 34 is an evanescent wave that is a near field standing wave with intensity that decays exponentially from the core-cladding boundary. It is desirable for the optical properties of the core 34 to be transparent at the first wavelength, $\lambda_1$ and the second wavelength, $\lambda_2$ and to have a refractive index that is higher than that of the cladding 32 material. Non-limiting examples of materials for the core 34 include materials used for optical fibers such as silicone dioxide based glasses and high refractive index plastics such as bromide based acrylics or chloride based styrenes. The cladding 32 may comprise a low refractive index dielectric material that is transparent at the second wavelength, $\lambda_2$. Non-limiting examples of materials for the cladding 32 material include low refractive index plastics such as fluorine based acrylics. In one embodiment, the cladding 32 material may be doped with or include an additive such as a chromatic pigment or dye to preferentially absorb the first wavelength $\lambda_1$ while allowing the second wavelength $\lambda_2$ to be transmitted.

Figure 3:
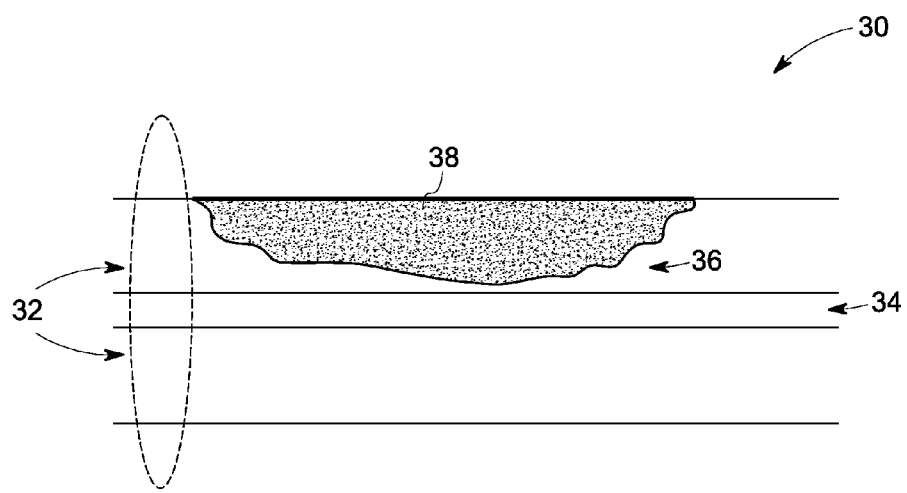
FIG. 3 illustrates an optical separation in accordance with an embodiment of the present invention.

FIG. 3 is a side view of the optical separation sensor 30 in accordance with an embodiment of the present invention. As shown, a section of an optical fiber of the optical separation sensor 30 includes the cladding 32 surrounding the core 34. In the embodiment of FIG. 3, the optical separation sensor 30 further comprises an optical interface element 38 situated near the periphery of the core 34 for coupling with the evanescent wave. The optical interface element 38 may be disposed into a partially etched portion 36 of the cladding 32, for example, such that part of the optical interface element 38 is close enough to the core 34 so that significant amplitude of the evanescent wave from the core 34 is present within the optical interface element 38. The optical interface element 38 may comprise a wavelength selective material configured for absorbing a higher percentage the optical power at the first wavelength $\lambda_1$ than at the second wavelength $\lambda_2$. Non limiting examples of the wavelength selective material include low refractive index dielectric materials doped with a chromatic pigment or dye to preferentially absorb the first wavelength $\lambda_1$ while allowing the second wavelength $\lambda_2$ to be transmitted. The dye or pigment is selected to remain stable at the temperature range of the operating environment. Examples pigment and dyes include iron oxide, copper, cobalt, chromium based pigments and anthraquinone, azo, nitro, and thizole based dyes.

This optical interface element is thus configured for absorbing varying intensities of the optical power at the first wavelength, $\lambda_1$ or the second wavelength, $\lambda_2$ depending on the distance between the core 34 and the optical interface element. That distance depends on the compression or decompression (tightness or looseness) of the ripple springs 20 during operation of the electrical machine. Thus, the amount of absorption of optical power by the optical interface element can be correlated to tightness or looseness of the ripple springs 20 between the stator windings 16. When the ripple springs 20 as shown in FIG. 2 are compressed together, the optical interface element 38 is at a minimum distance from the core 34. In this state, there will be maximum loss of optical power at first wavelength, $\lambda_1$ due to absorption of the evanescent wave by the wavelength selective material of the optical interface element 38 according to one embodiment. The percentage of loss of optical power is thereby proportionally related to the compression state of the ripple springs 20. In one embodiment, each of the ripple springs 20 may be calibrated with respect to compression and optical power loss at wavelength $\lambda_1$. In another embodiment, the optical fiber carrying the optical power to the separation sensor 100 may carry optical power at both the wavelength $\lambda_1$ and the wavelength $\lambda_2$. The loss of optical power associated with wavelength $\lambda_1$ may strongly depend upon the ripple spring's compression and hence the degree of separation of the top and bottom portions of the optical separation sensor 30. But the loss of optical power associated with wavelength $\lambda_2$ may be far less sensitive to the degree of separation of the top and bottom portions of the optical separation sensor 30. Thus, the ratio between optical power at wavelength $\lambda_1$ and at wavelength $\lambda_2$ can give a reliable measure of degree of separation, without regard to total optical power loss through the system, since losses due to connectors or fiber bends would affect the power at both wavelengths $\lambda_1$ and $\lambda_2$ equally. This assessment of separation (tightness or looseness) between the stator winding layers is carried out by a system 50 as shown in FIG. 4 in accordance with an embodiment of the present invention.

Figure 4:
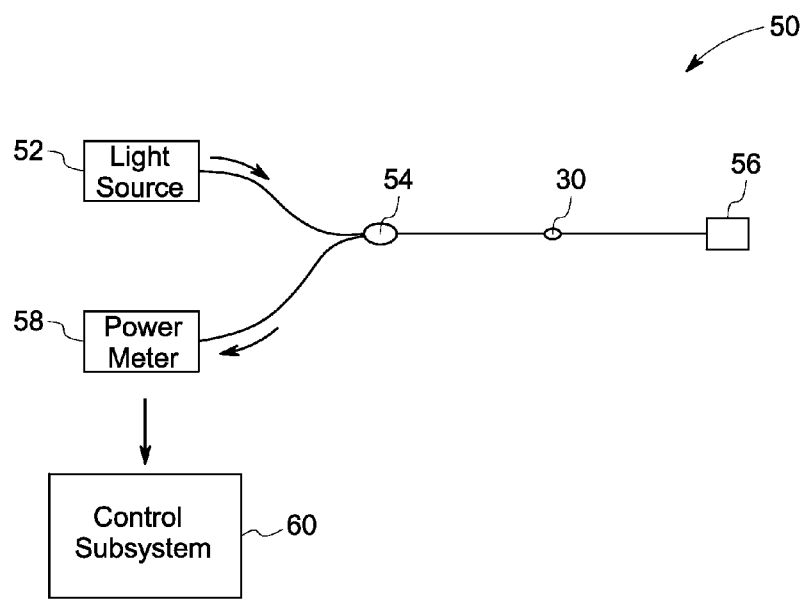
FIG. 4 shows a system for monitoring tightness of an electric machine in accordance with an embodiment of the present invention.

As illustrated, the system 50 of FIG. 4 comprises a light source 52 for providing the optical power at one or more wavelengths into the optical fiber of the optical separation sensor 30. The system 50 also includes a coupler 54 for directing the optical power from the light source to the optical separation sensor 30. The optical fiber carrying the optical power is terminated by a termination device 56 in one embodiment wherein the optical power after dissipation due to absorption by the optical interface element 38 (as shown in FIG. 3) at the optical separation sensor 30 is returned and is further directed by the coupler 54 to a power meter 58. In another embodiment (not shown), the dissipated light may be transmitted directly to a power meter instead of through the termination device and coupler. The power meter 58 measures an intensity of the optical power received after absorption by the optical separation sensor 30. A control subsystem 60 is communicatively coupled to the power meter 58 for assessing the separation between the stator winding layers based on the measured intensity of the optical power. The control subsystem 60 may include a processor that is configured to receive information from the light source 52 and the power meter 58 and to analyze data received from the sensor element 34 for determining the separation of the wedge system components. In a more specific embodiment the power meter is configured for being able to obtain intensities of the light at both first wavelength $\lambda_1$ and second wavelength $\lambda_2$ (or two power meters are used to obtain these intensities), and the control subsystem uses a ratio of the two intensities to determine the separation. As used herein, the term processor is not limited to just those integrated circuits referred to in the art as computers, but broadly refers to computers, microcontrollers, microcomputers, programmable logic controllers, application specific integrated circuits, and other programmable circuits.

Figure 5:
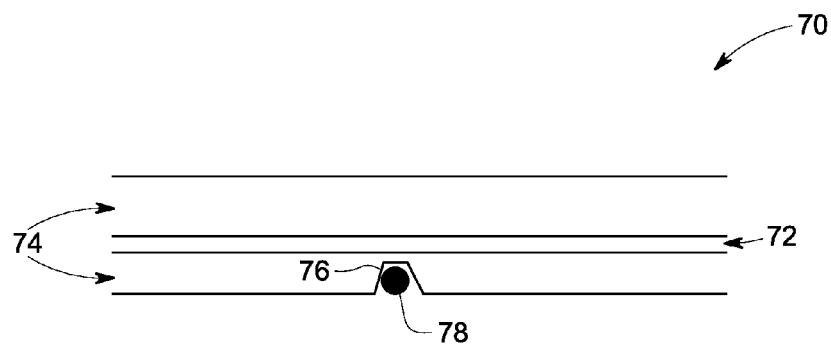
FIG. 5 illustrates an optical separation sensor in accordance with another embodiment of the present invention.

FIG. 5 illustrates an optical separation sensor 70 in accordance with another embodiment of the present invention. The optical separation sensor 70 comprises an optical fiber having a core 72 and a cladding 74. In this embodiment, the cladding 74 is etched away to form an indentation 76. The optical separation sensor 70 also includes a dielectric component 78, which is in the form of a small sphere and acts as a whispering-gallery mode (WGM) resonator for optical power at wavelength $\lambda_1$. Whispering-gallery mode resonances correspond to optical power that is trapped in circular orbits just within the surface of the dielectric component 78. The optical power is trapped due to continuous total internal reflection at the curved boundary surface. The dielectric component 78 is selected to absorb a significant amount of the optical power carried by the core 72 of the optical fiber at a wavelength $\lambda_1$ but a significantly lower amount of optical power at a wavelength $\lambda_2$. The whispering gallery modes occur at discrete frequencies that depend on index of refraction $n_s$ of the dielectric component 78 and radius $r_0$ of the spherical dielectric component 78. In one embodiment, the diameter of the spherical dielectric component 78 ranges from about 10 to about 1000 micrometers. In one embodiment, the optical separation sensor 70 is positioned between the wedge system components such that mechanical pressure keeps the dielectric component 78 in close proximity to the indentation 76 of the optical fiber.

Furthermore, in one specific embodiment, a ripple spring device comprises the optical separation sensor 30 or the optical separation sensor 70 located between two ripple springs. In other embodiments, the optical separation sensor 30 could be situated in other locations such as, for example, between stator wedge 21 and ripple spring 20, or between ripple spring 20 and shim 18 of FIG. 1.

Figure 6:
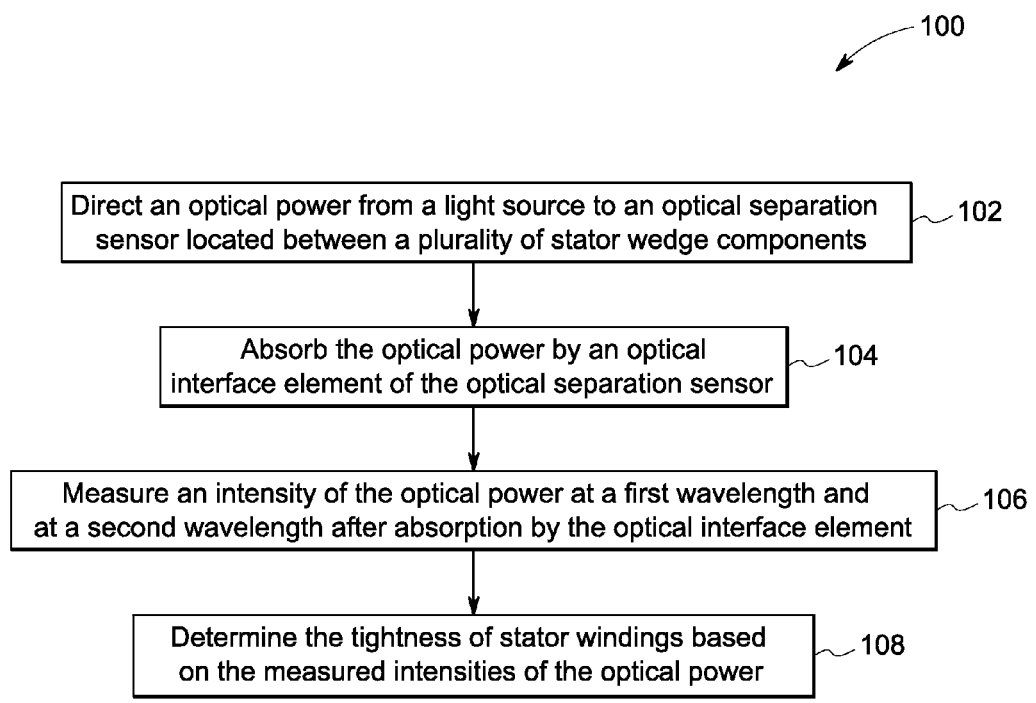
FIG. 6 is a flow chart of a method for monitoring tightness of an electrical machine in accordance with an embodiment of the present invention.

FIG. 6 is a flow chart of a method 100 for monitoring tightness of stator windings in an electrical machine in accordance with an embodiment of the present invention. At step 106, the method includes directing an optical power from a light source to an optical separation sensor located between multiple stator wedge components. At step 104, the method includes absorbing the optical power by an optical interface element of the optical separation sensor. Further, the method includes measuring an intensity of the optical power at a first wavelength and at a second wavelength after absorption by the optical interface element or a dielectric component at step 106. Finally, at step 108, the method includes determining the tightness of the stator windings based on the measured intensities of the optical power. In a more specific embodiment, calibration data related to a loss of light at the first wavelength corresponding to compressions of the stator may be used. A discussed above, in one embodiment, the optical interface element or the dielectric component is configured for higher percentage absorption of the optical power at the first wavelength as compared to percentage absorption of the optical power at the second wavelength.

Advantageously, the system and method ensures remote monitoring of tightness the electrical machine by enabling long term use of sensors with accurate measurement over time. The described method and system for condition monitoring can be applied to a variety of electrical machines such as generators, motors, broadband generators, and the like.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for monitoring tightness of stator windings in an electric machine, the system comprising:
    a light source for providing light at multiple wavelengths;
    an optical separation sensor situated in a stator core, wherein the optical separation sensor comprises an optical fiber core, an optical fiber cladding enclosing the optical fiber core, and an optical interface element situated in a region of the optical fiber cladding such that a portion of the provided light from the light source is absorbable by the optical interface element,
    wherein the optical interface element comprises a wavelength selective material configured for higher percentage absorption of the provided light at a first wavelength as compared to percentage absorption of the provided light at a second wavelength;

a meter for measuring intensities of the provided light at the first and second wavelengths after absorption by the optical interface element; and a control subsystem for using the measured intensities to assess the tightness of the stator windings.

2. The system of claim 1, wherein the optical separation sensor is situated between wedge system components, and wherein the optical interface element is situated at least partially within a section of the cladding for absorbing the provided light.

3. The system of claim 2, wherein the optical separation sensor is embedded within one of the plurality of wedge system components.

4. The system of claim 2, wherein the wedge system components comprises ripple springs, wedges, plates, shims, and combinations thereof.

5. The system of claim 2, wherein the optical fiber cladding comprises a portion with an indentation, and wherein the optical interface element comprises a dielectric component situated in the indentation.

6. The system of claim 5, wherein the dielectric component comprises a spherical shaped component configured for higher percentage absorption of the provided light at the first wavelength as compared to percentage absorption of the provided light at the second wavelength.

7. The system of claim 1, wherein the wavelength selective material comprises a dielectric material doped with a chromatic pigment or dye.

8. The system of claim 1, wherein the control subsystem uses a ratio of the measured intensities to assess the tightness of the stator windings.

9. A ripple spring device comprising:
a ripple spring;
an optical separation sensor in contact with the ripple spring, wherein the optical separation sensor comprises an optical fiber core, an optical fiber cladding enclosing the optical fiber core, and an optical interface element situated in a region of the optical fiber cladding such that a portion of the provided light from a light source is absorbable by the optical interface element, wherein the optical interface element comprises a wavelength selective material configured for higher percentage absorption of the provided light at a first wavelength as compared to percentage absorption of the provided light at a second wavelength.

10. The ripple spring device of claim 9 wherein the optical separation sensor is embedded into the ripple spring.

11. The ripple spring device of claim 9 wherein the optical separation sensor is held in place by adhesion or compression.

12. The ripple spring device of claim 9, wherein the cladding comprises a portion with an indentation and wherein the optical interface element comprises a dielectric component situated in the indentation.

13. A method for monitoring tightness of stator windings in an electrical machine, the method comprising:
providing light from a light source to an optical separation sensor located between a plurality of wedge system components;
absorbing the provided light by an optical interface element of the optical separation sensor, wherein the optical separation sensor comprises at least one optical fiber situated between the plurality of wedge system components, wherein the at least one optical fiber comprises a core and a cladding surrounding the core, and wherein the optical interface element is situated at least partially within a section of the cladding for absorbing the provided light, wherein the optical interface element is configured for higher percentage absorption of the provided light at a first wavelength as compared to percentage absorption of the provided light at a second wavelength;
measuring the provided light at the first and second wavelengths after absorption by the optical interface element; and
determining the tightness of the stator windings based on a ratio of the intensities at the first wavelength and the second wavelength.

* * * * *